(12) United States Patent
Lee (10) Patent No.: US 11,754,246 B2
(45) Date of Patent: Sep. 12, 2023

(54) LAMP FOR VEHICLE

(71) Applicant: HYUNDAI MOBIS CO., LTD., Seoul (KR)

(72) Inventor: Hyun Soo Lee, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 24 days.

(21) Appl. No.: 17/811,538

(22) Filed: Jul. 8, 2022

(65) Prior Publication Data

US 2023/0117279 A1 Apr. 20, 2023

(30) Foreign Application Priority Data

Oct. 20, 2021 (KR) .................. 10-2021-0140507

(51) Int. Cl.
*F21S 41/265* (2018.01)
*F21S 41/143* (2018.01)
*F21W 102/135* (2018.01)
*F21W 103/55* (2018.01)

(52) U.S. Cl.
CPC .......... *F21S 41/265* (2018.01); *F21S 41/143* (2018.01); *F21W 2102/135* (2018.01); *F21W 2103/55* (2018.01)

(58) Field of Classification Search
CPC ... F21S 41/265; F21S 41/143; F21W 2103/55
See application file for complete search history.

(56) References Cited

U.S. PATENT DOCUMENTS

| | | | |
|---|---|---|---|
| 10,808,902 B1* | 10/2020 | Lim | F21S 41/285 |
| 2016/0178155 A1* | 6/2016 | Owada | F21S 41/24 362/465 |
| 2017/0030543 A1* | 2/2017 | Gromfeld | F21S 41/322 |
| 2017/0144589 A1* | 5/2017 | Jung | F21S 41/265 |
| 2017/0307165 A1* | 10/2017 | Schöne | G02B 27/4272 |
| 2018/0058651 A1* | 3/2018 | Gromfeld | F21S 41/147 |
| 2018/0356066 A1* | 12/2018 | Song | F21V 5/04 |
| 2021/0301995 A1* | 9/2021 | Nishimura | F21S 41/265 |

* cited by examiner

*Primary Examiner* — Christopher E Dunay
(74) *Attorney, Agent, or Firm* — DLA PIPER LLP (US)

(57) ABSTRACT

A lamp for a vehicle. The lamp includes a light source part that irradiates light, and a lens structure that forms a specific beam pattern by projecting the light radiated by the light source part to a front side, the lens structure includes a body part that forms a body of the lens structure, the body part includes an input area formed in the body part, and that inputs the light irradiated by the light source part to the body part, an output area formed on a surface of the body part, from which the light is output, and that outputs the light input to the body part to the front side.

16 Claims, 6 Drawing Sheets

Fig.6 ically satisfied in an aspect of designs of the vehicle when the lamp is lighted. In
LAMP FOR VEHICLE

CROSS-REFERENCE TO RELATED APPLICATION

This application claims the benefit of priority to Korean Patent Application No. 10-2021-0140507, filed in the Korean Intellectual Property Office on Oct. 20, 2021, the entire contents of which are incorporated herein by reference.

TECHNICAL FIELD

The present disclosure relates to a lamp for a vehicle.

BACKGROUND

Various kinds of lamps are mounted on vehicles according to functions thereof, and for example, low beam lamps, high beam lamps, and daytime running light (DRL) lamps are mounted.

High beam lamps are mainly used to secure fields of view for more distant distances when there is no vehicle that host vehicles face during nighttime, and low beam lamps may be used to secure proper fields of view of drivers while not hindering fields of views of facing vehicles when there are the facing vehicles. DRL lamps are lamps that are lighted to secure fields of view of drivers and inform other vehicles of locations of host vehicles in short visual distance situations, such as in rainy weathers or while they travel in interiors of tunnels, even during daytime.

In general, the low beam lamps implement low beam patterns by using projection type optical systems, and the DRL lamps implement DRL patterns through primary optics, include separate optical systems according to functions and kinds thereof, and implement different images.

According to a conventional technology, because various lamps are mounted on a vehicle, light emitting surfaces according to respective optical systems are different, and thus various needs of consumers cannot be satisfied in an aspect of designs of the vehicle when the lamp is lighted. In addition, because the optical systems have to be equipped according to their functions, they are inefficient in aspects of manufacturing costs and time, and a separate space is necessary and thus a total volume of headlamps increase.

SUMMARY

The present disclosure has been made to solve the abovementioned problems occurring in the prior art while advantages achieved by the prior art are maintained intact.

An aspect of the present disclosure provides a lamp for a vehicle that implements a low beam pattern and a DRL pattern together by using one optical system and differentiates a front design by unifying daytime/nighttime lighting images of the lamp.

Another aspect of the present disclosure provides a lamp for a vehicle that minimizes a sense of break in an external appearance between an area for a low beam pattern and an area for a DRL pattern and make light emitting images uniform.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp for a vehicle includes a light source part that irradiates light, and a lens structure that forms a specific beam pattern by projecting the light radiated by the light source part to a front side, the lens structure includes a body part that forms a body of the lens structure, the body part includes an input area formed in the body part, and that inputs the light irradiated by the light source part to the body part, an output area formed on a surface of the body part, from which the light is output, and that outputs the light input to the body part to the front side, and a recessed part formed to have a shape that is recessed toward a middle area of the body part in an upward/downward direction, and that shields at least a portion of the light input to the body part, and the output area includes a plurality of facets.

The light source part may include a first light source provided on a rear side of the body part, and a second light source provided on a lower side of the body part, and the input area may include a first input surface formed on a surface of the body part, which faces the rear side, and that inputs light output from the first light source to the body part, and a second input surface formed in the recessed part of the body part, and that inputs light output from the second light source to the body part.

The second light source may be provided in a recessed space defined by the recessed part to irradiate the light toward the second input surface.

The output area may include a first output part that forms a first light distribution pattern with the light irradiated by the first light source, and including a plurality of first facets, and a second output part that forms a second light distribution pattern with the light irradiated by the second light source, and including a plurality of second facets.

The second output part may be formed on an upper side of the first output part.

The first light distribution pattern may form a low beam pattern, and the second light distribution pattern may form a daytime running light (DRL) pattern.

The body part may include a shield part formed in a rear area of the recessed part, and that shields a portion of the light input from the first light source to the body part, and a cutoff edge formed at an upper end portion of the shield part and that forms a cutoff line of a low beam pattern.

The second input surface may be formed in a front area of the recessed part, and the second input surface may be formed to be inclined downwards from the cutoff edge toward the front side.

The second light source may be provided between the shield part and the second input surface.

A location of a focus of the plurality of first facets in a vertical direction may be the same as a location of a focus of the plurality of first facets in a horizontal direction.

A first focus formed by the plurality of first facets may be formed at a location corresponding to the cutoff edge.

A location of a focus of the plurality of second facets in a vertical direction may be the same as or different from a location of a focus of the plurality of second facets in a horizontal direction.

A second focus that is a focus of the plurality of second facets in a vertical direction may be formed on a lower side of a first focus formed by the plurality of first facets.

The second light source may be located on the second focus.

The lamp may include a plurality of step connecting surfaces that connect the plurality of first facets such that the plurality of first facets are stepped, and an upward/downward cross-sectional shape of, among the plurality of step connecting surfaces, a step connecting surface that connects upwardly/downwardly adjacent ones of the plurality of first facets is inclined downwards as it goes to the front side.

Among the upwardly/downwardly adjacent ones of the plurality of first facets, the first facet disposed on a lower side may protrude toward the front side further than the first facet disposed on an upper side.

Among the upwardly/downwardly adjacent ones of the plurality of first facets, a radius of curvature of the first facet disposed on an upper side may be smaller than a radius of curvature of the first facet disposed on a lower side.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings.

First, the embodiments described herein are embodiments that are suitable for understanding the technical features of a lamp for a vehicle according to the present disclosure. However, the present disclosure is not limited to the embodiment described below or the technical features of the present disclosure are not limited by the described embodiments, and the present disclosure may be variously modified without departing from the technical scope of the present disclosure.

Figure 1:
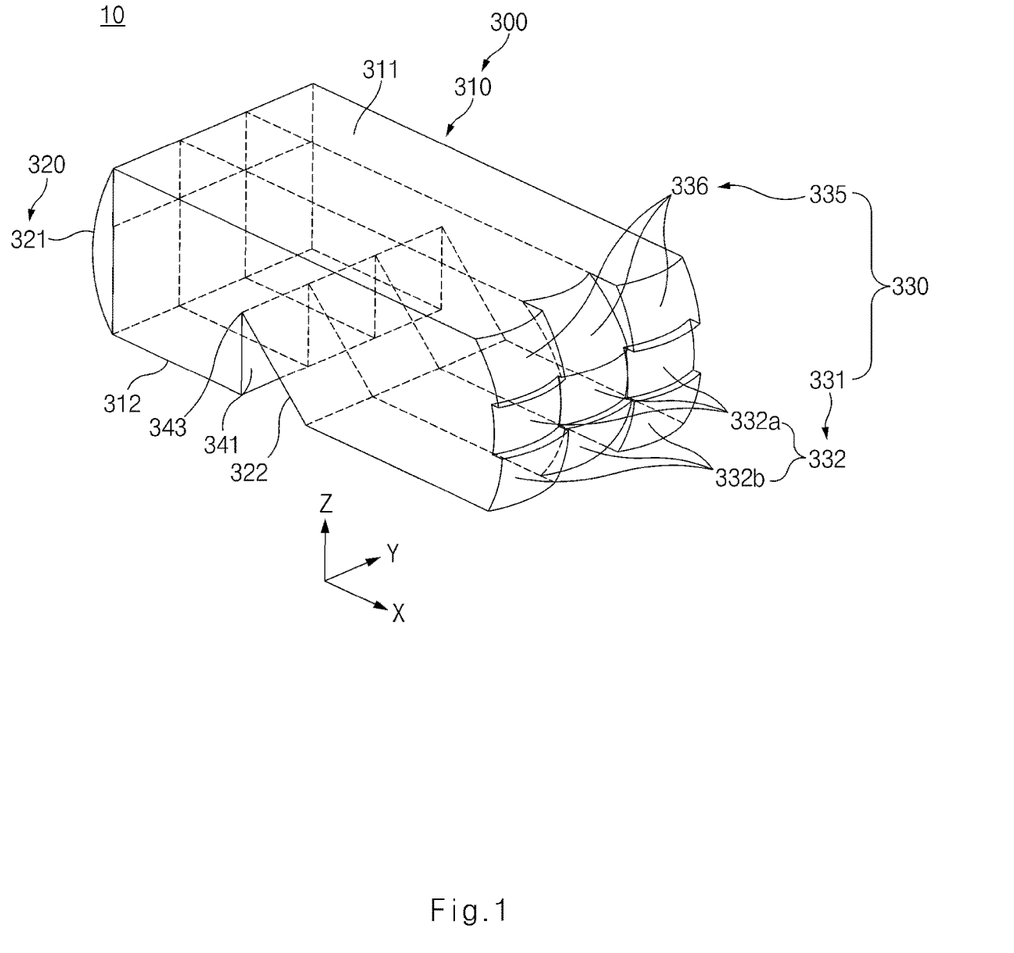
FIG. 1 is a perspective view illustrating a lamp for a vehicle according to an embodiment of the present disclosure.
Figure 2:
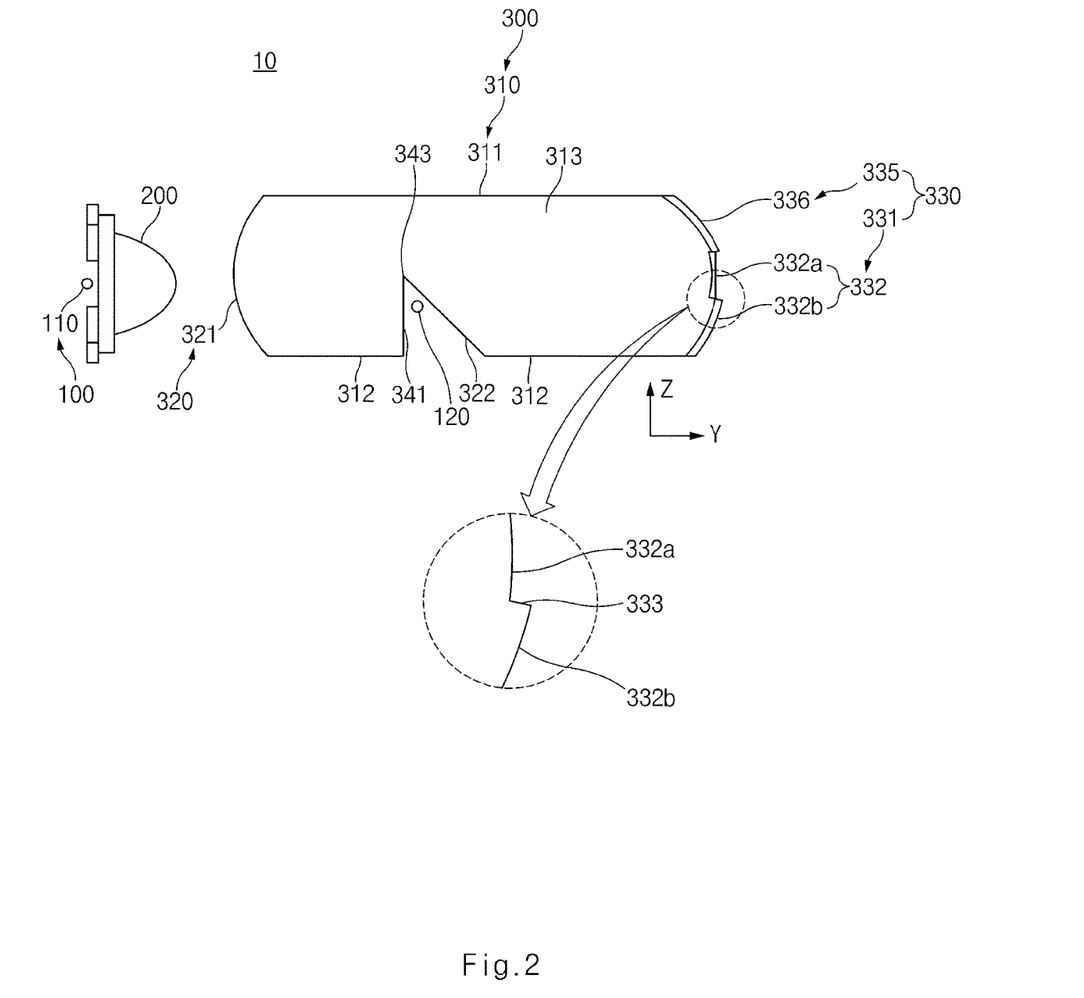
FIG. 2 is a side view illustrating a lamp for a vehicle according to an embodiment of the present disclosure.
Figure 3:
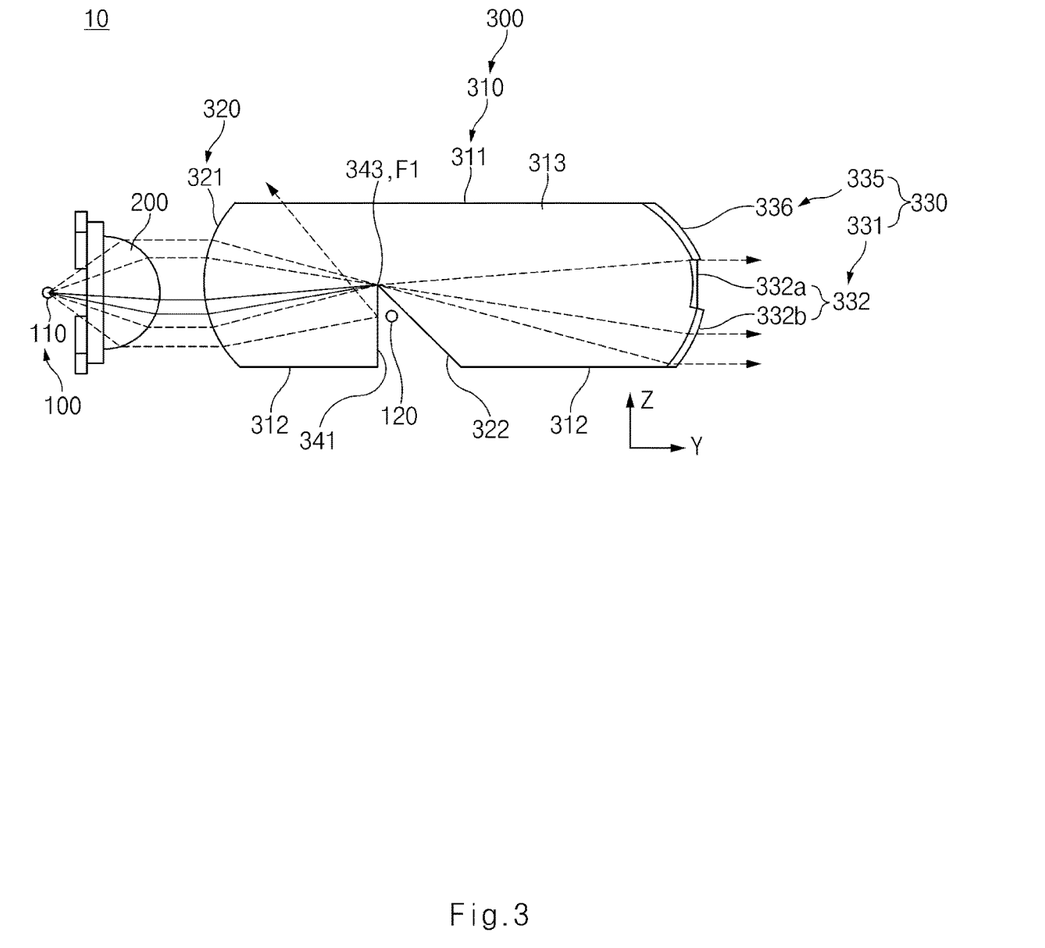
FIG. 3 is a side view illustrating a lamp for a vehicle according to an embodiment of the present disclosure, and is a view illustrating a case, in which a first light source is lighted.
Figure 4:
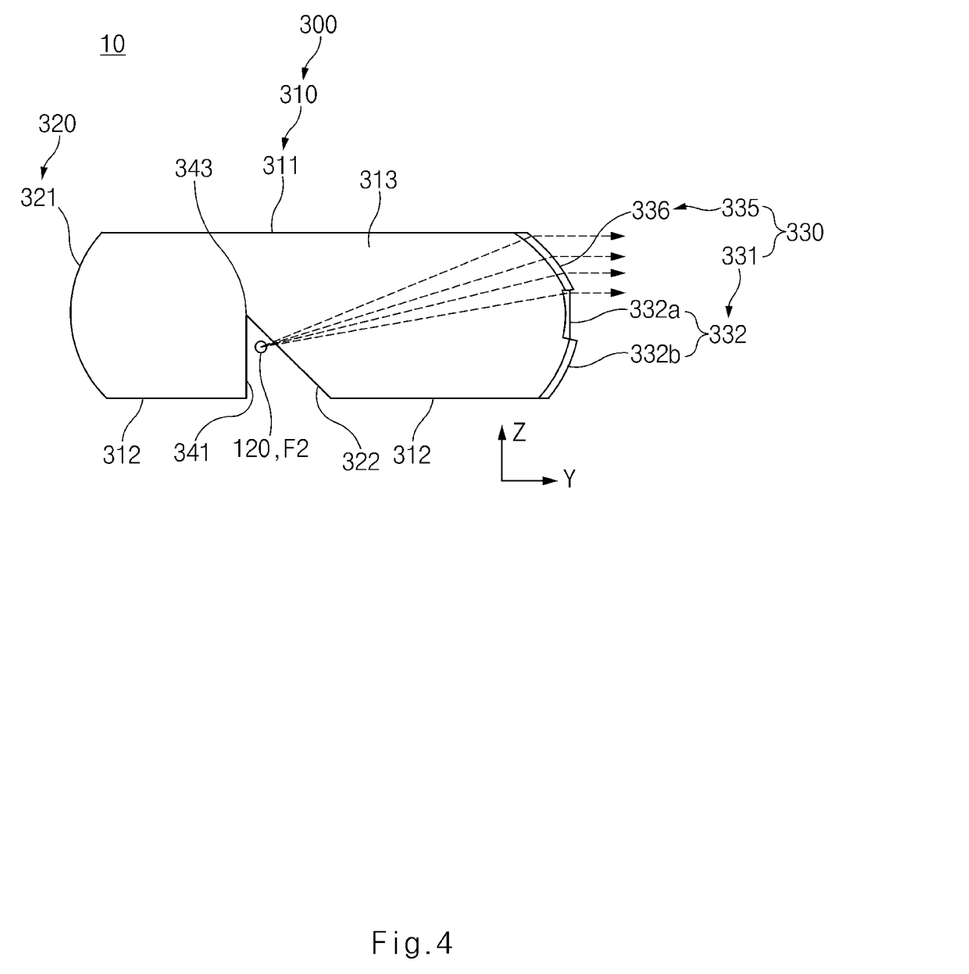
FIG. 4 is a side view illustrating a lamp for a vehicle according to an embodiment of the present disclosure, and is a view illustrating a case, in which a second light source is lighted.
Figure 5:
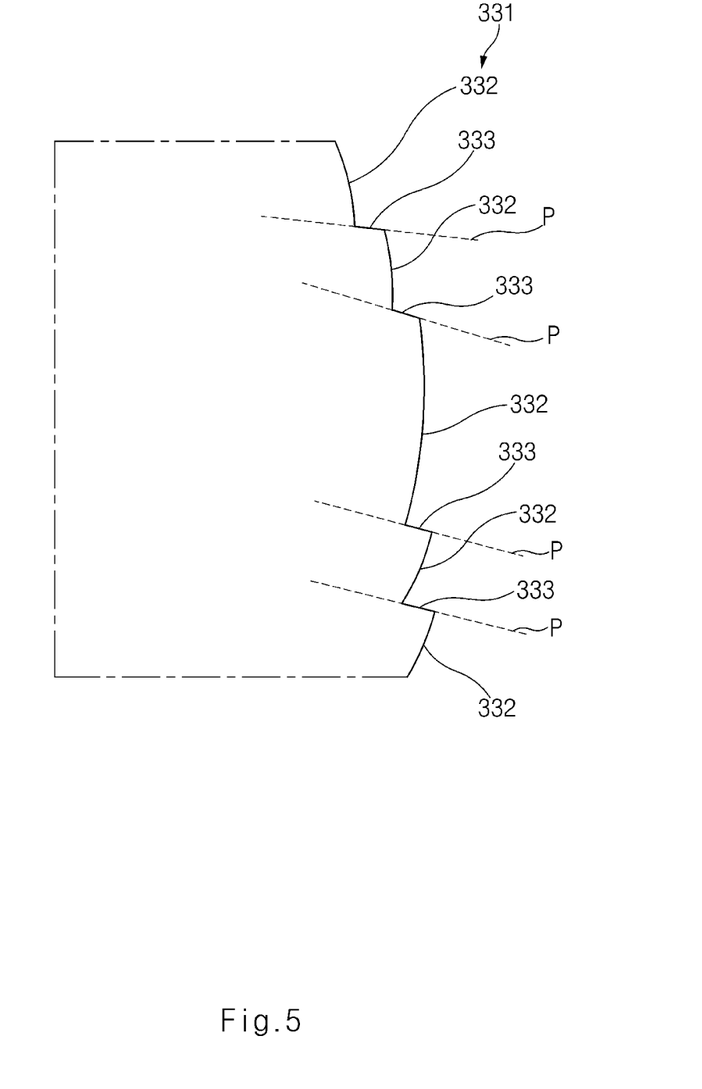
FIG. 5 illustrates a first output part according to another embodiment of the present disclosure, and is a view illustrating a case, in which a first facet has three or more steps vertically.
Figure 6:
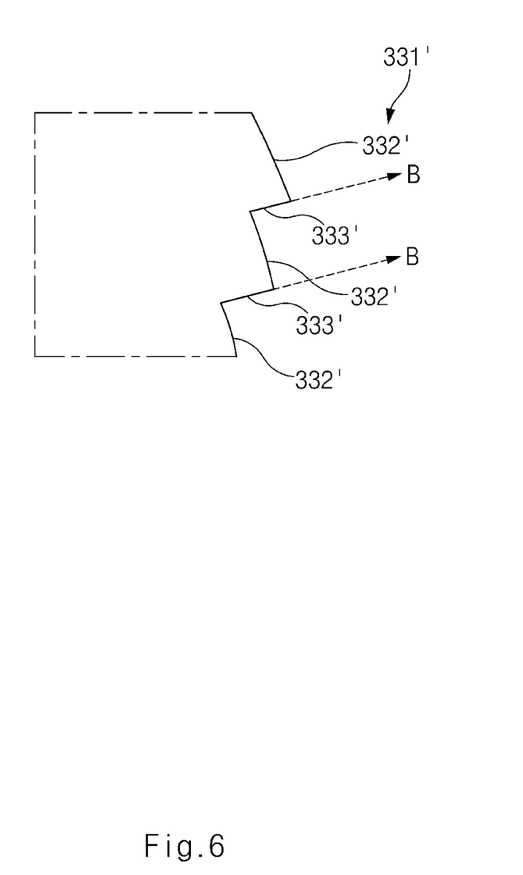
FIG. 6 is a side view illustrating a first output part according to a comparative example of the present disclosure.

FIG. 1 is a perspective view illustrating a lamp for a vehicle according to an embodiment of the present disclosure. FIG. 2 is a side view illustrating the lamp for a vehicle according to the embodiment of the present disclosure. FIG. 3 is a side view illustrating the lamp for a vehicle according to the embodiment of the present disclosure, and is a view illustrating a case, in which a first light source is lighted. FIG. 4 is a side view illustrating the lamp for a vehicle according to the embodiment of the present disclosure, and is a view illustrating a case, in which a second light source is lighted. FIG. 5 illustrates a first output part according to another embodiment of the present disclosure, and is a view illustrating a case, in which a first facet has three or more steps vertically. FIG. 6 is a side view illustrating a first output part according to a comparative example of the present disclosure.

A lamp 10 for a vehicle according to the present disclosure may form two or more kinds of light distribution patterns. For example, the lamp 10 for a vehicle according to the embodiment of the present disclosure may implement a first light distribution pattern, and a second light distribution pattern that is different from the first light distribution pattern in one optical system at the same time. That is, the lamp 10 for a vehicle according to the present disclosure may form the first light distribution pattern and the second light distribution pattern with light output from the same light emitting surface of the one optical system.

As an example, the first light distribution pattern may be a low beam pattern, and the second light distribution pattern may be a daytime running light (DRL) pattern. However, the kinds of the first light distribution pattern and the second light distribution pattern are not limited to the above-described ones, and may be applied to various kinds of beam patterns.

Referring to FIGS. 1 to 4 (312), the lamp 10 for a vehicle according to an embodiment of the present disclosure includes a light source part 100 and a lens structure 300.

The light source part 100 is configured to irradiate light. Various elements or devices, which may emit light, may be used for the light source part 100. The light source part 100 may include a light source that generates light, and the light source, for example, may be a light emitting diode (LED). For example, the light source part 100 may include a first light source 110 for forming the first light distribution pattern, and a second light source 120 for forming the second light distribution pattern.

The lens structure 300 may form a specific beam pattern by projecting the light irradiated by the light source part 100 to the front side. Hereinafter, a direction, in which the light is output from the lens structure 300, will be referred to as a front side, and an opposite direction to the front side will be referred to a rear side.

In detail, the lens structure 300 may include a body part 310 that forms a body of the lens structure 300, and the body part 310 may be formed of a material that transmits input light. The body part 310 may include an input area 320, an output area 330, and a recessed part.

The input area 320 is formed in the body part 310, and inputs the light irradiated by the light source part 100, to the body part 310. Furthermore, the output area 330 is formed on a surface of the body part 310, from which the light is output, and outputs the light input to the body part 310 to the front side.

In detail, the input area 320 and the output area 330 may be integrally formed with the body part 310. The output area 330 may be formed on the surface, from which the light is output, that is, a surface of the body part 310, which faces the front side. The input area 320 may be formed on a surface that faces the light source part 100, for example, may be formed on a surface, which faces the rear side or the lower side of the body part 310.

The output area 330 may include a plurality of facets. For example, the output area 330 may be provided in a form of a multi-facet lens. Light emitting surfaces of at least some of the plurality of facets may have a shape of an aspheric lens or an anamorphic lens, but the kinds of the facets are not limited thereto.

The plurality of facets may be provided to have independent curvatures. Here, the expression of the independent curvatures means that the plurality of facets may be formed to have different sizes and different curvatures. For example, the plurality of facets may be formed of a group having the same size and curvature.

Furthermore, the plurality of facets of the output area 330 may be divided into a group for forming the first light distribution pattern and a group for forming the second light distribution pattern.

The recessed part has a shape that is recessed toward a middle area of the body part 310 in an upward/downward direction, and shields at least a portion of the light that is input to the body part 310.

In detail, the recessed part may have a shape that is recessed toward the middle area from a lower surface 312 of the body part 310. Then, the recessed part may be formed to be disposed on a path, in which a portion of the light input to the body part 310 travels, and may be configured such that a portion of the light is shielded to form a specific pattern.

For example, a shield part 341 formed in the recessed part may shield a portion of the light that travels after being input from the rear surface of the body part 310 to form a cutoff line of a low beam pattern that is the first light distribution pattern. In detail, the lens structure 300 may be formed to have a structure for minimizing loss of light, and may form the recessed part by deforming a partial shape of the body part 310 to form the cutoff line. Accordingly, the cutoff line may be formed while not provided with a separate shield member.

In this way, the lamp 10 for a vehicle according to the embodiment of the present disclosure may implement the low beam pattern and the DRL pattern together by using one optical system, and a design of the front surface may be differentiated by unifying the daytime and night lighting images of the lamp.

Furthermore, according to the embodiment of the present disclosure, by implementing a surface light emitting image by providing the plurality of facets in the output area 330, a sense of breakoff between the area for the low beam pattern and the area for the DRL pattern may be minimized, and the light emitting image may become uniform.

Furthermore, according to the embodiment of the present disclosure, a cutoff line of the low beam pattern may be formed even when a separate shield member is not provided, by forming the recessed part in the body part 310 of the lens structure 300.

Meanwhile, the light source part 100 may include the first light source 110 and the second light source 120.

The first light source 110 may be provided on a rear side of the body part 310, and may form the first light distribution pattern. Furthermore, the second light source 120 may be provided on a lower side of the body part 310, and may form the second light distribution pattern. For example, the first light source 110 and the second light source 120 may be light emitting diodes (hereinafter, referred to as an LED). However, the kinds of the first light source 110 and the second light source 120 are not limited thereto.

A collimator 200 may be provided between the first light source 110 and the lens structure 300, and may convert the light radiated from the first light source 110 to light that is parallel to an optical axis of the lens structure 300 and input the light to the lens structure 300.

The input area 320 may include a first input surface 321 and a second input surface 322.

The first input surface 321 may be formed on the surface of the body part 310, which faces the rear side, and may input the light output from the first light source 110 to the body part 310. The second input surface 322 may be formed on the recessed part of the body part 310, and may input the light output from the second light source 120 to the body part 310.

In detail, the body part 310 may include an upper surface 311 that connects the first input surface 321 and the output area 330, the lower surface 312 that is disposed to face the upper surface 311, and a side surface 313 that is disposed between the upper surface 311 and the lower surface 312. Here, the light input from the first and second light sources to the body part 310 may not be totally reflected on the upper surface 311, the lower surface 312, and the side surface 313 of the body part 310. The recessed part may be formed to be recessed toward a central portion of the body part 310 in one area of the lower surface 312.

The first input surface 321 may be formed on the surface of the body part 310, which faces the rear side, and may input the light output from the first light source 110 to the body part 310. For example, the first input surface 321 may be formed to have a shape that is convex toward the rear side. The light emitted by the first light source 110 may be input to the body part 310 through the first input surface 321 and be output to the front side through the output area 330 to form the first light distribution pattern.

The second input surface 322 may be formed on the recessed part of the body part 310, and may input the light output from the second light source 120 to the body part 310. The light emitted by the second light source 120 may be input to the body part 310 through the second input surface 322 and be output to the front side through the output area 330 to form the second light distribution pattern.

For example, the second light source 120 may be provided in the recessed space defined by the recessed part to irradiate the light toward the second input surface 322. However, a location of the second light source 120 is not limited thereto, and may be formed on a lower side of the recessed space as long as the light may be irradiated toward the second input surface 322.

Meanwhile, the body part 310 may include the shield part 341 and a cutoff edge 343.

The shield part 341 may be formed in a rear area of the recessed part, and may shield a portion of the light that is input from the first light source 110 to the body part 310. Furthermore, the cutoff edge 343 may be formed at an upper end portion of the shield part 341, and may form the cutoff line of the low beam pattern.

In detail, the shield part 341 may be formed by depositing a material that shields light. For example, the shield part 341 may be formed by depositing an aluminum material, but the present disclosure is not limited thereto. The light input through the first input surface 321 may be interrupted from being reflected by the shield part 341 and traveling forwards. A shape of the upper end portion of the low beam pattern may be determined according to a shape of the cutoff edge 343. Here, the shape of the cutoff edge 343 is not limited, and may be variously determined according to a design specification for forming the low beam pattern.

The second input surface 322 may be formed in a front area of the recessed part, and the second input surface 322 may be formed to be inclined downwards from the cutoff edge 343 toward the front side.

In detail, the recessed part may be formed to be recessed toward a central area from the lower surface 312 of the body part 310, the shield part 341 may be formed on a surface that is adjacent to the first input surface 321, and the second input surface 322 may be formed on a surface that is adjacent to the output area 330. The cutoff edge 343 may be formed in a part, in which the shield part 341 and the second input surface 322 meet each other.

For example, the second input surface 322 may be formed to be inclined downwards as it goes to the front side. Accordingly, the light input from the second light source 120 may travel toward a second output part 335 located on an upper side of the output area 330. However, inclination angles and shapes of the shield part 341 and the second input surface 322 are not limited to the illustrated embodiment described above.

Furthermore, for example, the second light source 120 may be provided between the shield part 341 and the second input surface 322. In detail, the second light source 120 may be located on a lower side of an area, in which the second input surface 322 is formed, with respect to an optical axis direction (the X axis direction). However, a location of the second light source 120 is not limited thereto.

The output area 330 may include a first output part 331 and the second output part 335.

The first output part 331 may form the first light distribution pattern with the light irradiated by the first light source 110, and may include a plurality of first facets 332. Furthermore, the second output part 335 may form the second light distribution pattern with the light irradiated by the second light source 120, and may include a plurality of second facets 336. That is, the first output part 331 and the second output part 335 may be formed on the front side of the body part 310 to be provided in the one optical system.

For example, the first facet 332 and the second facet 336 may be formed to have a curved shape that is convex toward the front side, and may be formed to have different curvatures. The plurality of first facets 332 and the plurality of second facets 336 may be provided in a horizontal direction (the Y axis direction) and a vertical direction (the Z axis direction), respectively. As an example, the plurality of second facets 336 may be arranged vertically in one step, and three second facets 336 may be arranged horizontally. Furthermore, the plurality of first facets 332 may be arranged vertically in two steps and three first facets 332 may be arranged horizontally (see FIGS. 1 to 4), or may be arranged vertically in three or more steps (see FIG. 5).

The first output part 331 including the plurality of first facets 332 may form the first light distribution pattern, and the second output part 335 including the plurality of second facets 336 may form the second light distribution pattern. Here, the first light distribution pattern may be a low beam pattern, and the second light distribution pattern may be a daytime running light (DRL) pattern. That is, in the embodiment of the present disclosure, the low beam pattern and the DRL pattern may be implemented in the one optical system.

Here, the second output part 335 may be formed on an upper side of the first output part 331. That is, the plurality of second facets 336 may be located on an upper side of the plurality of first facets 332.

Meanwhile, a location of a focus of the plurality of first facets 332 in the vertical direction (the Z axis direction) may be the same as a location of a focus of the plurality of first facets 332 in the horizontal direction (the Y axis direction).

In detail, the plurality of first facets 332 may form one focus in the vertical direction, and the plurality of first facets 332 may form one focus in the horizontal direction. Furthermore, the focuses of the plurality of first facets in the horizontal direction and the vertical direction may be located at the same location. Hereinafter, the focus formed by the plurality of first facets 332 will be referred to as a first focus F1.

The first focus F1 formed by the plurality of first facets 332 may be formed at a location corresponding to the cutoff edge 343. That is, the cutoff edge 343 may be disposed on the focus of the first output part 331.

Meanwhile, the location of the focus of the plurality of second facets 336 in the vertical direction may be the same as or different from the location of the focus of the plurality of second facets 336 in the horizontal direction.

In detail, the plurality of second facets 336 may form one focus in the vertical direction, and the plurality of second facets 336 may form one focus in the horizontal direction. Furthermore, the focuses of the plurality of second facets 336 in the horizontal direction and the vertical direction may be located at the same location or different locations. Hereinafter, the focus formed by the plurality of second facets 336 in the vertical direction will be referred to as a second focus F2.

The second focus F2 that is the focus of the plurality of second facets 336 in the vertical direction may be formed on a lower side of the first focus F1 formed by the plurality of first facets 332. For example, the second focus F2 may be disposed on a lower side of the first focus F1, and may be disposed on a front side of the first focus F1. However, a location of the second focus F2 is not limited to the illustrated embodiment, and may be disposed at various locations according to a design specification of the lens structure 300.

The second light source 120 may be located on the second focus F2. In detail, the second light source 120 may be provided at a location corresponding to the focus of the second facet 336 in the vertical direction to irradiate the light toward the second input surface 322. The light input through the second input surface 322 may be output to the front side through the second output part 335.

Meanwhile, a plurality of step connecting surfaces 333 that connect the plurality of first facets 332 such that the plurality of first facets 332 are stepped may be provided. Furthermore, a cross-sectional shape of, among the plurality of step connecting surfaces 333, the step connecting surface 333 that connects first facets 332a and 332b disposed to be adjacent to each other in the vertical direction (the Y axis direction) may be formed to be inclined downwards as it goes to the front side. For reference, in FIG. 5, reference numeral "P" is an imaginary surface obtained by extending the step connecting surface 333.

In detail, the plurality of first facets 332 provided in the first output part 331 may be formed to be stepped from each other, and the step connecting surface 333 may be a surface that connects the first facets 332a and 332b disposed to be adjacent to each other in the upward/downward direction. On a plane obtained by cutting the first output part 331 by a plane (the XY plane) that is parallel to an optical axis and is perpendicular to the first output part 331, the step connecting surface 333 may be formed to be inclined downwards as it goes to the front side.

Furthermore, among upwardly/downwardly adjacent ones of the plurality of first facets 332, the first facet 332b disposed on a lower side may protrude toward the front side further than the first facet 332a disposed on an upper side. That is, the plurality of first facets 332a and 332b of the first output part 331 may be formed to be stepped to protrude to the front side as it goes downwards.

Accordingly, the light output through the first output part 331 may be minimized from traveling upwards from the step connecting surface 333 to minimize a glare phenomenon in the light distribution pattern.

In detail, the step connecting surface 333 may be formed to be inclined to form a specific angle with the optical axis, and the light may travel upwards according to an angle of the step connecting surface 333 to generate the glare phenomenon. FIG. 6 illustrates a first output part 331' according to a comparative example of the present disclosure. The first output part 331' according to the comparative example includes a plurality of first facets 332', and step connecting surfaces 333' that connect them. The first output part 331' according to the comparative example is formed to be stepped to protrude as it goes upwards, and the step connecting surfaces 333' that connect the plurality of first facets 332' are formed to be inclined upwards as it goes to the front side. As in the comparative example, when the step connecting surface 333' is formed to be inclined upwards, the light that reached the first output part 331' may totally reflected by the step connecting surface 333', and may travel upwards (see direction B). Due to refraction of the light, the glare phenomenon may be generated, and thus a performance of the lamp may be degraded.

In the first output part 331 according to the present disclosure, the step connecting surface 333 may be formed to be inclined downwards as it goes to the front side and the first facet 332 disposed on the lower side may be formed to protrude further, whereby a phenomenon, in which the light is totally reflected by the step connecting surface 333, may be prevented. Accordingly, the glare phenomenon may be minimized and thus the performance of the lamp may be enhanced (see FIGS. 2 to 5).

Furthermore, for example, among the upwardly/downwardly adjacent ones of the plurality of first facets 332, a radius of curvature of the first facet 332 disposed on the upper side may be formed to be smaller than a radius of curvature of the first facet 332 disposed on lower side. Accordingly, a phenomenon, in which the light travels upwards on the step connecting surface 333, may be prevented more effectively.

In this way, the lamp for a vehicle according to the embodiment of the present disclosure may implement the low beam pattern and the DRL pattern together by using one optical system, and a design of the front surface may be differentiated by unifying the daytime and night lighting images of the lamp.

Furthermore, according to the embodiment of the present disclosure, by implementing a surface light emitting image by providing the plurality of facets in the output area, a sense of breakoff between the area for the low beam pattern and the area for the DRL pattern may be minimized, and the light emitting image may become uniform.

Furthermore, according to the embodiment of the present disclosure, a cutoff line of the low beam pattern may be formed even when a separate shield member is not provided, by forming the recessed part in the body part of the lens structure.

Although the specific embodiments of the present disclosure have been described until now, the spirit and scope of the present disclosure are not limited to the specific embodiments, and may be variously corrected and modified by an ordinary person in the art, to which the present disclosure pertains, without changing the essence of the present disclosure claimed in the claims.

What is claimed is:

1. A lamp for a vehicle, comprising:
a light source configured to irradiate light; and
a lens structure configured to form a specific beam pattern by projecting the light from the light source to a front side of the lamp,
wherein the lens structure includes a body part that includes:
an input area configured to input the light irradiated by the light source;
an output area formed on a surface of the body part and configured to output the light input to the body part to the front side; and
a recessed part formed to have a shape that is recessed toward a middle area of the body part in an upward/downward direction, and configured to shield at least a portion of the light input to the body part,
wherein the output area includes a plurality of facets;
the light source including:
a first light source provided on a rear side of the body part; and
a second light source provided on a lower side of the body part;
the output area including:
a first output part including a plurality of first facets and configured to form a first light distribution pattern with the light irradiated by the first light source; and
a second output part including a plurality of second facets and configured to form a second light distribution pattern with the light irradiated by the second light source.

2. The lamp of claim 1,
wherein the input area includes:
a first input surface formed on a surface of the body part, which faces the rear side, and configured to input light output from the first light source; and
a second input surface formed in the recessed part of the body part, and configured to input light output from the second light source.

3. The lamp of claim 2, wherein the second light source is provided in a recessed space defined by the recessed part to irradiate the light toward the second input surface.

4. The lamp of claim 1, wherein the second output part is formed on an upper side of the first output part.

5. The lamp of claim 1, wherein the first light distribution pattern forms a low beam pattern, and
wherein the second light distribution pattern forms a daytime running light (DRL) pattern.

6. The lamp of claim 1, wherein the body part includes:
a shield part formed in a rear area of the recessed part, and configured to shield a portion of the light input from the first light source; and
a cutoff edge formed at an upper end portion of the shield part and configured to form a cutoff line of a low beam pattern.

7. The lamp of claim 6, wherein the second input surface is formed in a front area of the recessed part, and
the second input surface is formed to be inclined downwards from the cutoff edge toward the front side.

8. The lamp of claim 7, wherein the second light source is provided between the shield part and the second input surface.

9. The lamp of claim 6, wherein a first focus formed by the plurality of first facets is formed at a location corresponding to the cutoff edge.

10. The lamp of claim 1, wherein a location of a focus of the plurality of first facets in a vertical direction is the same as a location of a focus of the plurality of first facets in a horizontal direction.

11. The lamp of claim 10, wherein a second focus that is a focus of the plurality of second facets in a vertical direction is formed on a lower side of a first focus formed by the plurality of first facets.

12. The lamp of claim 11, wherein the second light source is located on the second focus.

13. The lamp of claim 1, wherein a location of a focus of the plurality of second facets in a vertical direction is the same as or different from a location of a focus of the plurality of second facets in a horizontal direction.

14. The lamp of claim 1, comprising:
- a plurality of step connecting surfaces that connect the plurality of first facets such that the plurality of first facets are stepped, and
- an upward/downward cross-sectional shape of a step connecting surface that connects upwardly/downwardly adjacent ones of the plurality of first facets is inclined downwards as it goes to the front side.

15. The lamp of claim 14, wherein the first facet disposed on a lower side protrudes toward the front side further than the first facet disposed on an upper side.

16. The lamp of claim 14, wherein a radius of curvature of the first facet disposed on an upper side is smaller than a radius of curvature of the first facet disposed on a lower side.

\* \* \* \* \*